(12) United States Patent
Ohshio

(10) Patent No.: US 6,375,457 B1
(45) Date of Patent: Apr. 23, 2002

(54) METHOD FOR MANUFACTURING A MULTILAYERED CERAMIC ELECTRONIC COMPONENT

(75) Inventor: Minoru Ohshio, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 96 days.

(21) Appl. No.: 09/608,031

(22) Filed: Jun. 30, 2000

(30) Foreign Application Priority Data

Jun. 30, 1999 (JP) ............................................. 11-186315
Aug. 11, 1999 (JP) ............................................. 11-227129

(51) Int. Cl.$^7$ ................................................. H01G 7/00
(52) U.S. Cl. ........................ 432/17; 432/121; 29/25.42
(58) Field of Search ................................. 432/9, 11, 14, 432/18, 17, 27, 121, 136, 143; 29/25.42, 592.1; 266/108, 144, 257, 266; 264/26

(56) References Cited

U.S. PATENT DOCUMENTS

| | | | |
|---|---|---|---|
| 4,177,035 A | * 12/1979 | Buschermohle | ............. 432/121 |
| 5,046,946 A | * 9/1991 | Yasuda et al. | ................. 432/11 |
| 5,101,319 A | * 3/1992 | Diffeyes et al. | ........... 29/25.42 |
| 5,230,846 A | * 7/1993 | Tamhankar et al. | ........... 264/61 |
| 5,735,027 A | * 4/1998 | Hageman et al. | .......... 29/25.42 |

* cited by examiner

*Primary Examiner*—Gregory Wilson
(74) *Attorney, Agent, or Firm*—Rosenman & Colin, LLP

(57) ABSTRACT

A method for manufacturing a multilayered ceramic electronic component includes the step of firing multilayered ceramic bodies having therein ceramic layers and internal electrodes in a firing furnace while flowing one or more atmosphere gases thereinto, wherein the ratio of the amount of the atmosphere gases introduced into the firing furnace per a time period to the amount of organic materials included in the multilayered ceramic bodies introduced into the firing furnace per the time period is between about 200 L/g and about 1200 L/g. Further, the multilayered ceramic bodies are introduced into the firing furnace along a first direction and the atmosphere gases flow in the firing furnace along a direction opposite to the first direction.

9 Claims, 8 Drawing Sheets

METHOD FOR MANUFACTURING A MULTILAYERED CERAMIC ELECTRONIC COMPONENT

FIELD OF THE INVENTION

The present invention relates to a method for manufacturing a multilayered ceramic electronic component, e.g., a multilayered ceramic capacitor; and, more particularly, to a method for manufacturing a multilayered ceramic electronic component using a laminated ceramic body.

BACKGROUND OF THE INVENTION

In manufacturing a multilayered ceramic electronic component using a laminated ceramic body, the laminated ceramic body is, generally, fired in a tunnel furnace.

In order to reduce the cost of electrode materials, internal electrodes made of a base metal such as Ni are commonly employed in multilayered ceramic electronic components. A firing process for such multilayered ceramic electronic components is therefore carried out in a reductive or a neutral atmosphere in order to prevent an increase of internal resistance due to, e.g., the oxidation of the internal electrodes and obtain desired characteristics of the multilayered ceramic components. For this reason, various tunnel furnaces for performing a firing process in a reductive or a neutral atmosphere have been developed. In such a tunnel furnace, unfired multilayered ceramic bodies are loaded thereinto using a pallet having multiple shelves on which the unfired multilayered ceramic bodies are placed.

However, when firing the multilayered ceramic bodies in the furnace, gaseous organic materials are generated from the ceramic bodies due to the heat of the furnace, which in turn causes local disturbance of the atmosphere of the furnace during the firing process, resulting in local firing non-uniformities in the fired ceramic bodies to occur depending on their locations in the furnace.

SUMMARY OF THE INVENTION

It is, therefore, an object of the present invention to provide a method for manufacturing multilayered ceramic electronic components having reduced deviations in the electrical characteristics thereof. In accordance with the present invention, it becomes possible to maintain the stable atmosphere in the firing furnace without being affected by the gaseous products generated from the organic materials contained in the ceramic bodies being processed by the firing process. Accordingly, the firing non-uniformity problem of the prior art can be substantially ameliorated and the variation of the electrical characteristics of the resultant multilayered ceramic electronic component is substantially reduced.

In accordance with an embodiment of the present invention, there is provided a method for manufacturing a multilayered ceramic electronic component includes the step of firing multilayered ceramic bodies having therein ceramic layers and internal electrodes in a firing furnace while flowing one or more atmosphere gases thereinto, wherein the ratio of the amount of the atmosphere gases introduced into the firing furnace per a time period to the amount of organic materials included in the multilayered ceramic bodies introduced into the firing furnace per the time period is between about 200 L/g and about 1200 L/g and the multilayered ceramic bodies are introduced into the firing furnace along a first direction and the atmosphere gases flow in the firing furnace along a direction opposite to the first direction.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

The preferred embodiments of the present invention will now be described in detail with reference to a multilayered ceramic capacitor.

The major constituent of the raw materials of the dielectric being used for forming ceramic layers of typical multilayered ceramic capacitor is $BaTiO_3$. Normally, glass components mainly composed of $Si_2O_3$, $B_2O_3$ and/or $Li_2O_3$ are also added in order to lower the sintering temperature. Oxides of rare-earth elements, such as Y, La, Ce, Pr, Nd, Pm, Sm, Eu, Gd, Tb, Dy, Ho, Er, Tm, Yb or Lu, or transition metals, e.g., Sc, Ti, V, Cr, Mn, Fe, Co or Ni are also be preferably added to the composition in order to tailor the resistance to reduction or temperature characteristics.

An exemplary process for preparing a dielectric composition for forming ceramic layers of the multilayered ceramic capacitor is as follows:

First, the predetermined amounts of starting materials are mixed in, e.g., a ball mill, with water. Thereafter, the mixture is dried by a spray drier or the like and calcined at a temperature range, e.g., from 800° C. to 1300° C. for 2 to 10 hours to obtain a dielectric oxides, which are then ground in a ball mill, a jet mill, or the like, to particles of desired sizes.

Next, slurry is prepared by mixing the ground dielectric material obtained above with an organic binder and a solvent, e.g., in a ball mill, a basket mill or a bead mill. A plasticizer and a disperse agent may be added, if necessary.

The binder may be selected from, e.g., abietic resin, polyvinyl butyral, ethyl cellulose or acrylic resin. The solvent may be selected from, e.g., ethanol, terpineol, butyl carbitol, toluene or kerosene. The plasticizer may be selected from, e.g., abietic acid derivative, diethyl oxalic acid, polyethylene glycol, polyalkylene glycol, phthalate ester or dibuthyl phthalate. The dispersing agent may be selected from, e.g., glycerin, octadecyl amine, trichloroacetic acid, oleic acid, octadiene, ethyl oleate, glycerol monooleate, glycerol trioleate, glycerol tristearate.

The slurry is typically composed of 30 to 80 weight % of dielectric material, 2 to 5 weight % of binder, 0.1 to 5 weight % of plasticizer, 0.1 to 5 weight % of dispersing agent, and 20 to 70 weight % of solvent.

Figure 1:
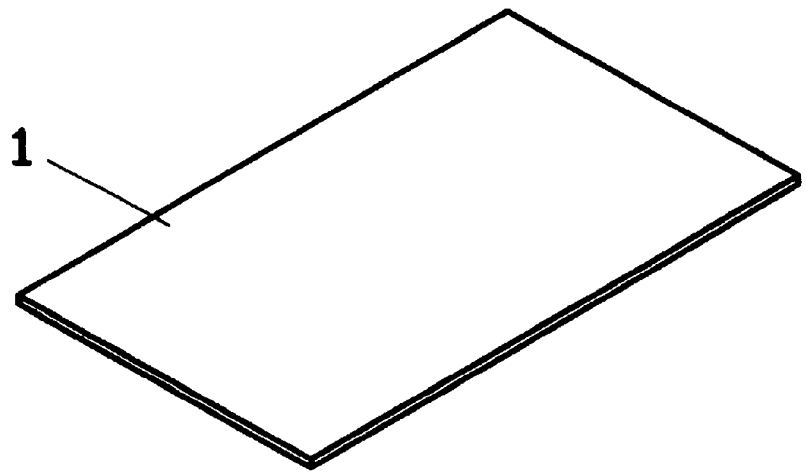
FIG. 1 shows a perspective view of a bare ceramic green sheet.

Thereafter, ceramic green sheets of 1 to 20 $\mu$m thickness are formed from the slurry by using, for example, a doctor blade, a die coater or a reverse coater. These ceramic green sheets are then cut into a number of ceramic green sheets of a desired size, and one of those is shown in FIG. 1. Then, as shown in FIG. 2, internal electrode patterns 2a, 2b are printed on the surfaces of ceramic green sheets 1a, 1b.

A paste for the internal electrodes is prepared by mixing a conductive material with organic materials. The conductive material may be selected from base metals such as Ni, Cu, or a compound or a mixture thereof. There are no particular restrictions on the shape of these materials; and, for example, materials of a sphere-shape, a ring-shape or the mixture thereof may be used. The mean particle size of the conductive material is 0.1 to 10 $\mu$m, and preferably 0.1 to 1 $\mu$m. The organic materials include a binder and a solvent. The binder may be selected from ethyl cellulose, acrylic resin, butyl resin, or any other conventional binder and may be included by 1 to 10 weight %. The solvent may be selected from terpineol, butyl carbitol, kerosene, or any other conventional solvent; and may be included by 20 to 55 weight %. The paste may also contain additives of less than 10 weight %, which includes, e.g., a disperse agent such as sorbitan fatty acid ester; and glycerin fatty acid ester, a plasticizer such as dioctyl phthalate, dibutyl phthalate and butyl phtaryl glicoric butyl; and/or various kinds of ceramic powders of, e.g., dielectric or insulation materials for preventing delamination and sintering of the electrode patterns. An organic metal resinate may also be included in the additives.

Figure 2:
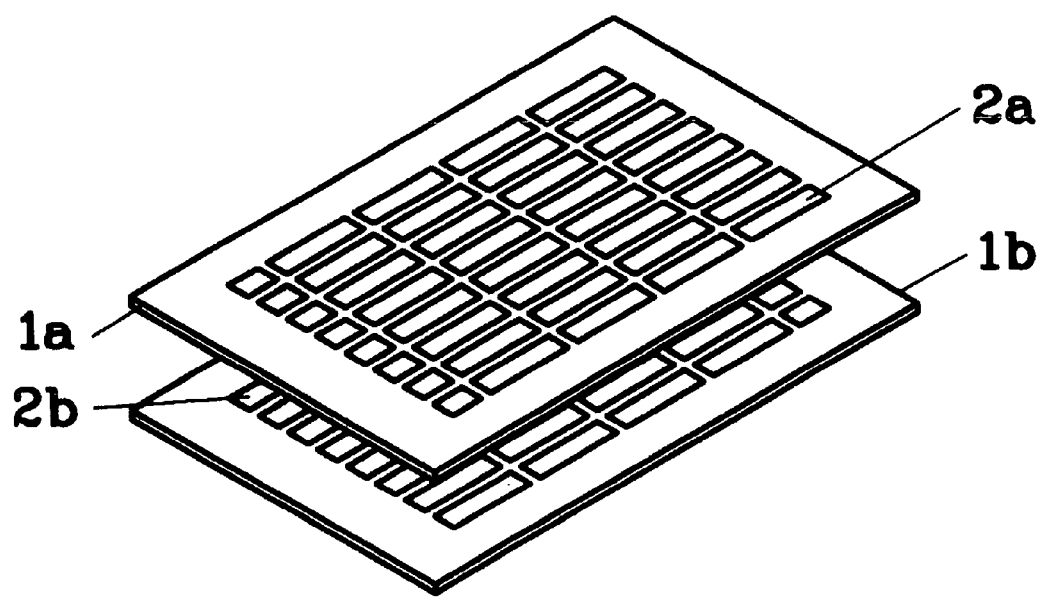
FIG. 2 describes a perspective view of two ceramic green sheets with the different internal electrode patterns printed thereon.

The paste for the internal electrodes is printed onto the each surface of the ceramic green sheets 1a, 1b to form two types of patterns 2a, 2b as shown in FIG. 2 via a printing method, a pattern transferring method or a sheet method. In FIG. 2, the ceramic green sheets having the internal electrode pattern printed thereon are labeled as "1a", "1b" in order to distinguish them from bare ceramic green sheets 1 (see FIG. 3) having no internal electrode patterns thereon.

Figure 3:
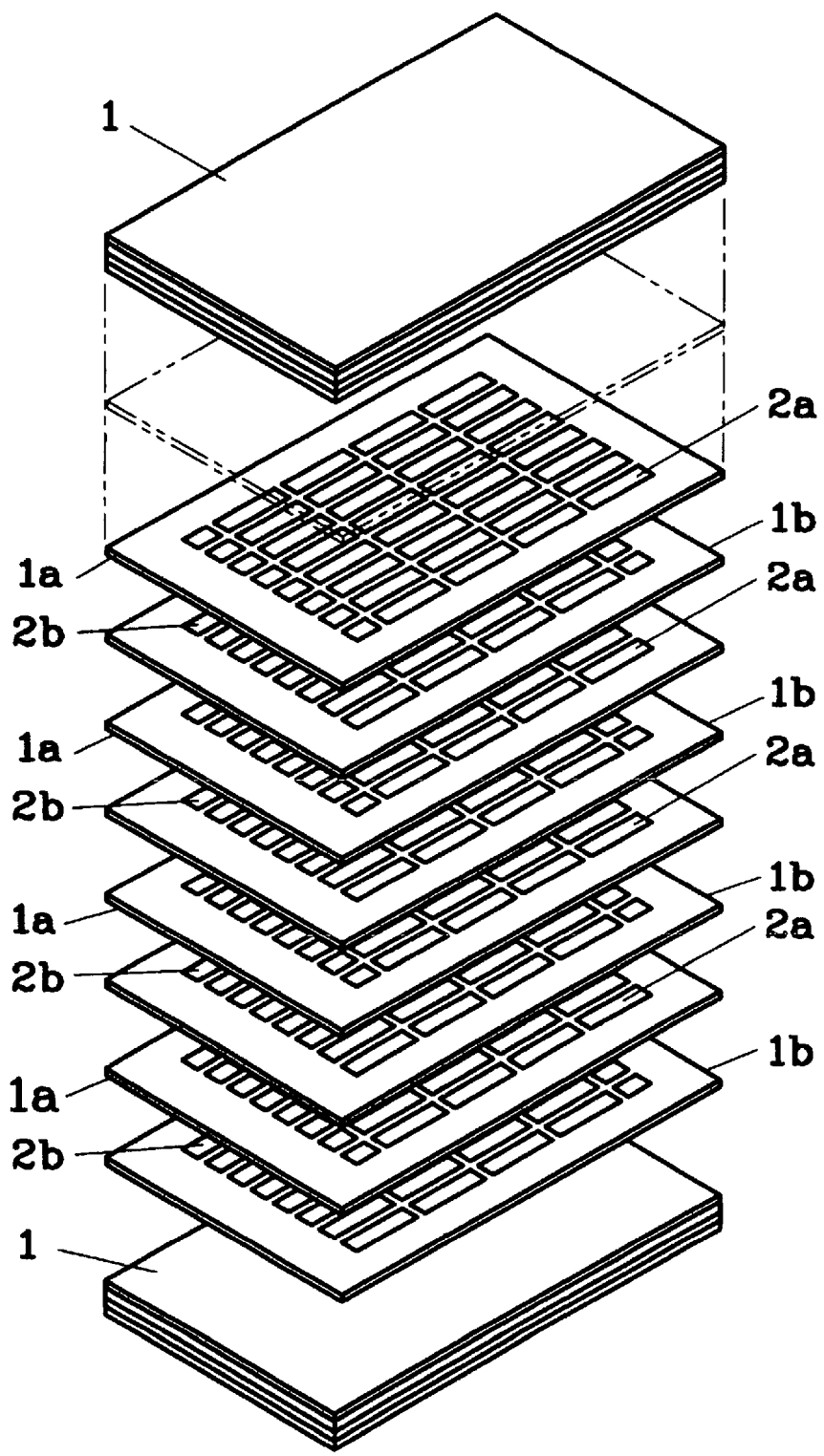
FIG. 3 illustrates an exploded perspective view of a laminated ceramic body obtained by stacking the base ceramic green sheets and the ceramic green sheets.
Figure 4:
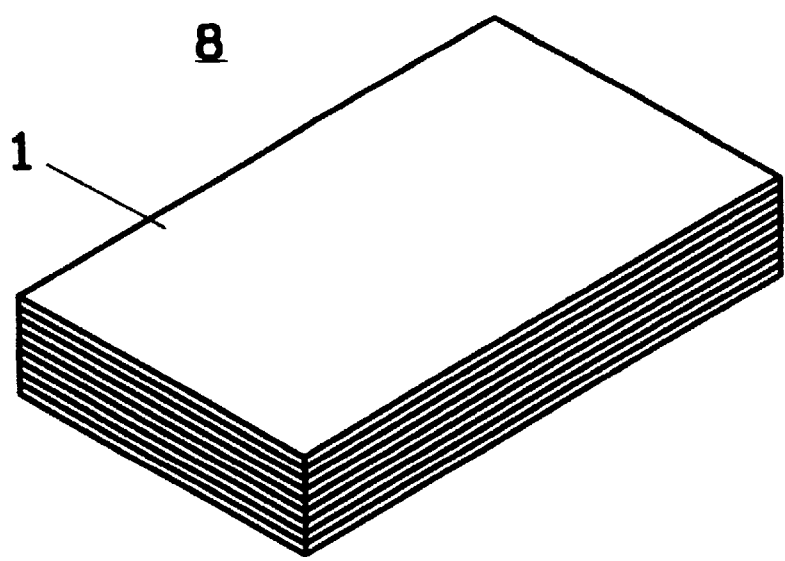
FIG. 4 offers a perspective view of the laminated ceramic body in FIG. 3.

The two types of ceramic green sheets 1a, 1b with different internal electrode patterns 2a, 2b are stacked alternately; and the bare ceramic sheets 1 without the internal electrode pattern are stacked against the outermost sheets of the stacked ceramic sheets 1a and 1b, as shown in FIG. 3. Thereafter, these stacked ceramic green sheets 1, 1a and 1b are pressed to form a laminated ceramic body 8 shown in FIG. 4. The laminated ceramic body 8 may also be formed by the so-called slurry built method wherein the laminated ceramic body is fabricated by forming and printing ceramic green sheets and internal electrode patterns in a desired order on a starting ceramic green sheet.

Figure 5:
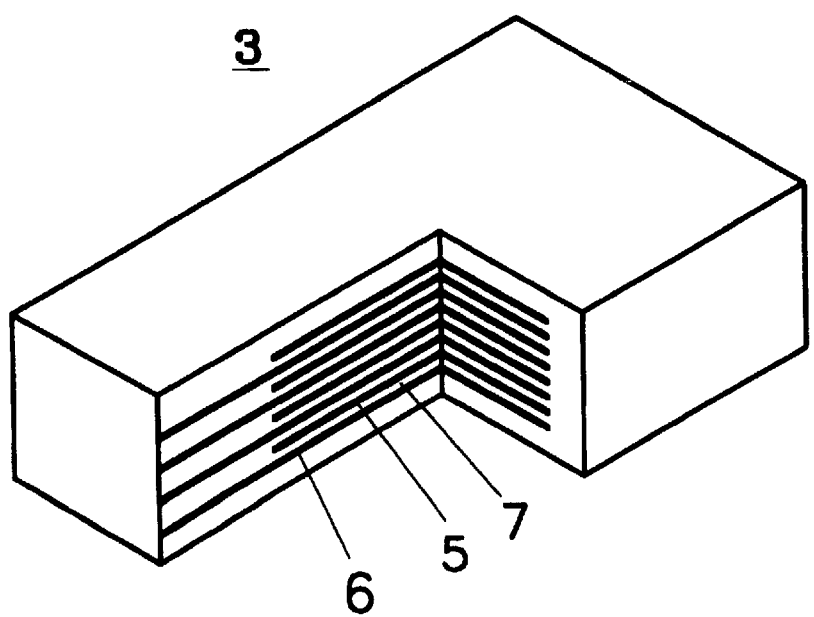
FIG. 5 depicts a partially cutaway perspective view of a chip-shaped multilayered ceramic body formed by dicing the laminated ceramic body in FIG. 4.
Figure 6:
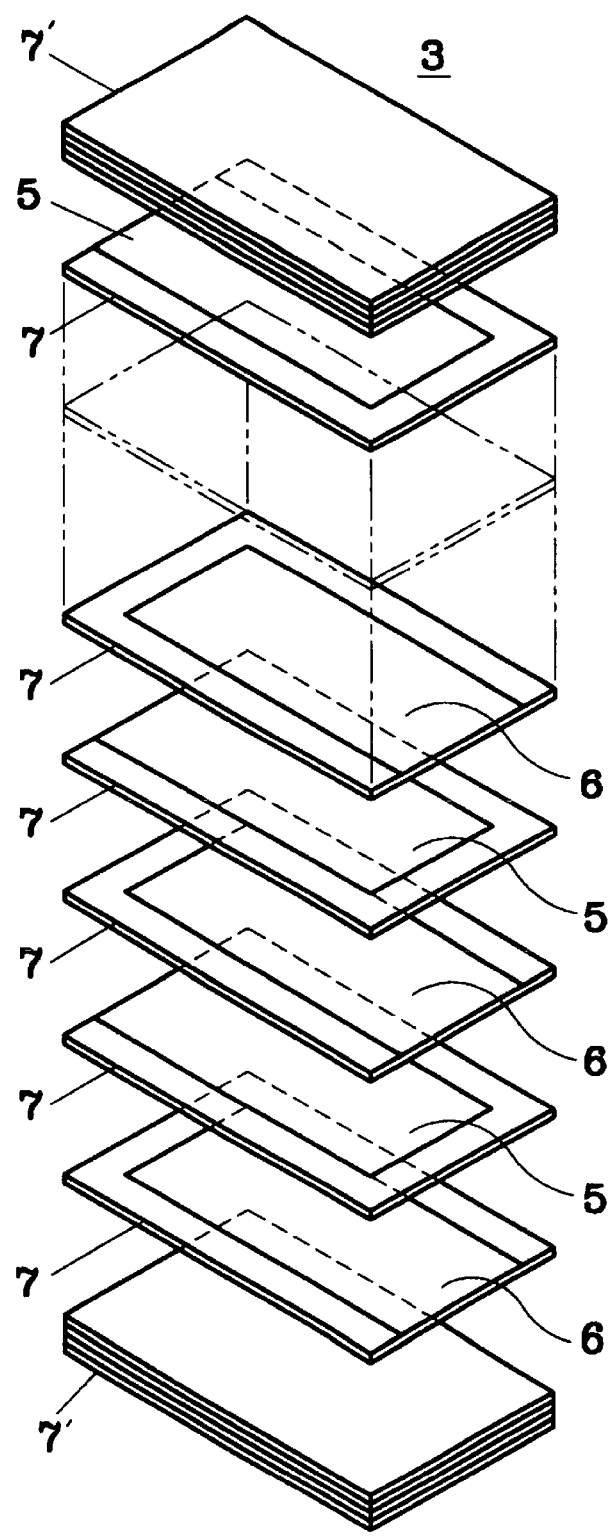
FIG. 6 presents an exploded perspective view of the chip-shaped multilayered ceramic body in FIG. 5.

The laminated ceramic body is diced into chip-shaped multilayered ceramic bodies. One of the multilayered ceramic bodies is shown in FIG. 5. The multilayered ceramic body 3 of FIG. 5 includes a plurality of stacked ceramic layers 7 having, respectively, alternating internal electrodes 5, 6 exposed on two opposite sides, as shown in FIG. 6. Stacked on each of two outermost layers of the stacked ceramic layers 7 is a multiplicity of bare ceramic layers 7' having no internal electrode thereon.

Next, the multilayered ceramic bodies 3 are subjected to a binder removing process, wherein the multilayered ceramic bodies 3 are heated to remove most of the organic materials including the binders incorporated therein.

The shapes or sizes of these chip-shaped bodies are determined according to the use or purpose of the multilayered ceramic capacitor. For instance, the size of a hexahedron-shaped multilayered ceramic chip capacitor is normally 1.0–3.2 mm×0.5–1.6 mm×0.5–1.6 mm.

Next, the multilayered ceramic body is fired. The term "firing of the multilayered ceramic body 3" used herein refers to a process of sintering the multilayered ceramic body 3 and simultaneously baking the internal electrodes 5, 6, by heating the multilayered ceramic body 3;and does not include the binder removing process (calcinations) for partially removing the organic materials including the binder contained in the multilayered ceramic bodies 3 in such a way that a controlled portion of the organic material is left behind in the multilayered ceramic body before firing.

The multilayered ceramic body 3 can be fired using a tunnel furnace or a box furnace. It is preferable, however, to employ the tunnel furnace in the multilayered ceramic electronic component manufacturing method of the present invention.

The process of firing the binder-removed or the unfired multilayered ceramic body using the tunnel furnace will now be described hereinbelow.

Figure 7:
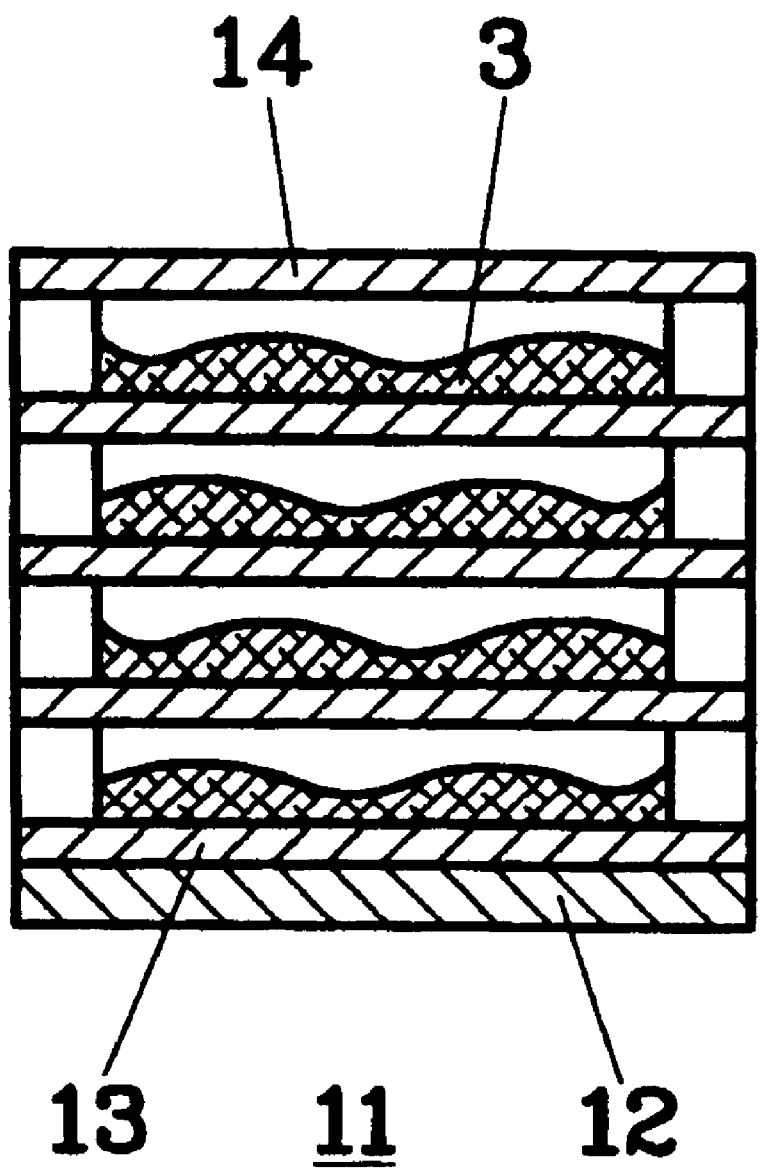
FIG. 7 represents a longitudinal sectional view of a pallet for carrying the many chip-shaped multilayered ceramic bodies thereon.

There is shown in FIG. 7, a pallet or a carrier 11 for use in loading the multilayered ceramic bodies 3 into a firing furnace.

The pallet 11 includes a base 12 made of, e.g., an alumina based material, a first shelf 13 directly stacked on the base 12, and a plurality of, e.g., four, second shelves 14 stacked on the first shelf 13, the shelves 13, 14 being of the plate shape and made of an alumina based material. Each second shelf 14 has, e.g., four legs extending downward from four corners on the bottom surface thereof, the legs functioning as spacers for maintaining a predetermined distance between two neighboring shelves. The multilayered ceramic bodies 3 to be fired are disposed on the first and the second shelves 13, 14 excepting the top second shelf 14 as shown in FIG. 7, multilayered ceramic bodies being disposed on shelves without overlapping from each other. The pallet 11 having the multilayered ceramic bodies 3 placed thereon is loaded into a firing chamber 23 as shown in FIGS. 8 and 9;and unloaded from the firing chamber 23 after finishing the firing process.

Figure 8:
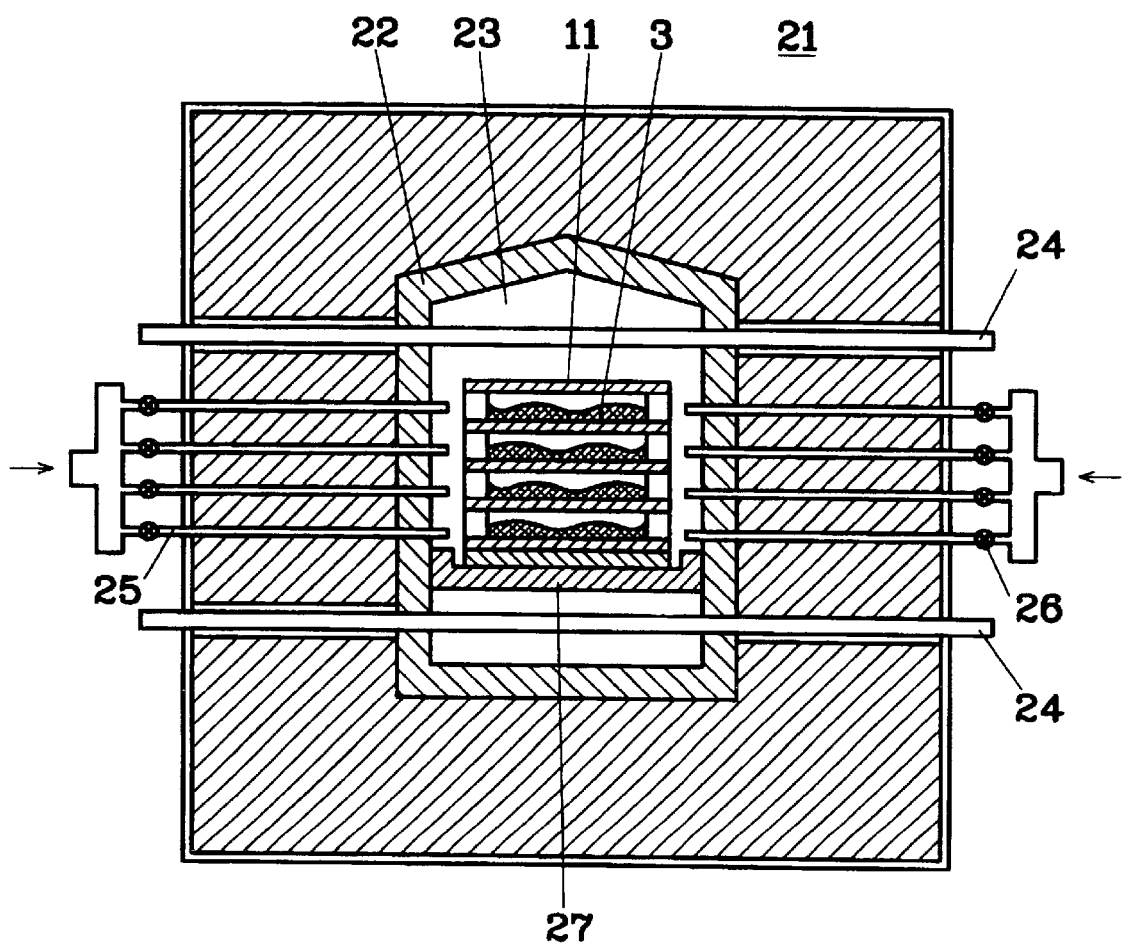
FIG. 8 is a longitudinal sectional view of a tunnel furnace in which the pallet is mounted.
Figure 9:
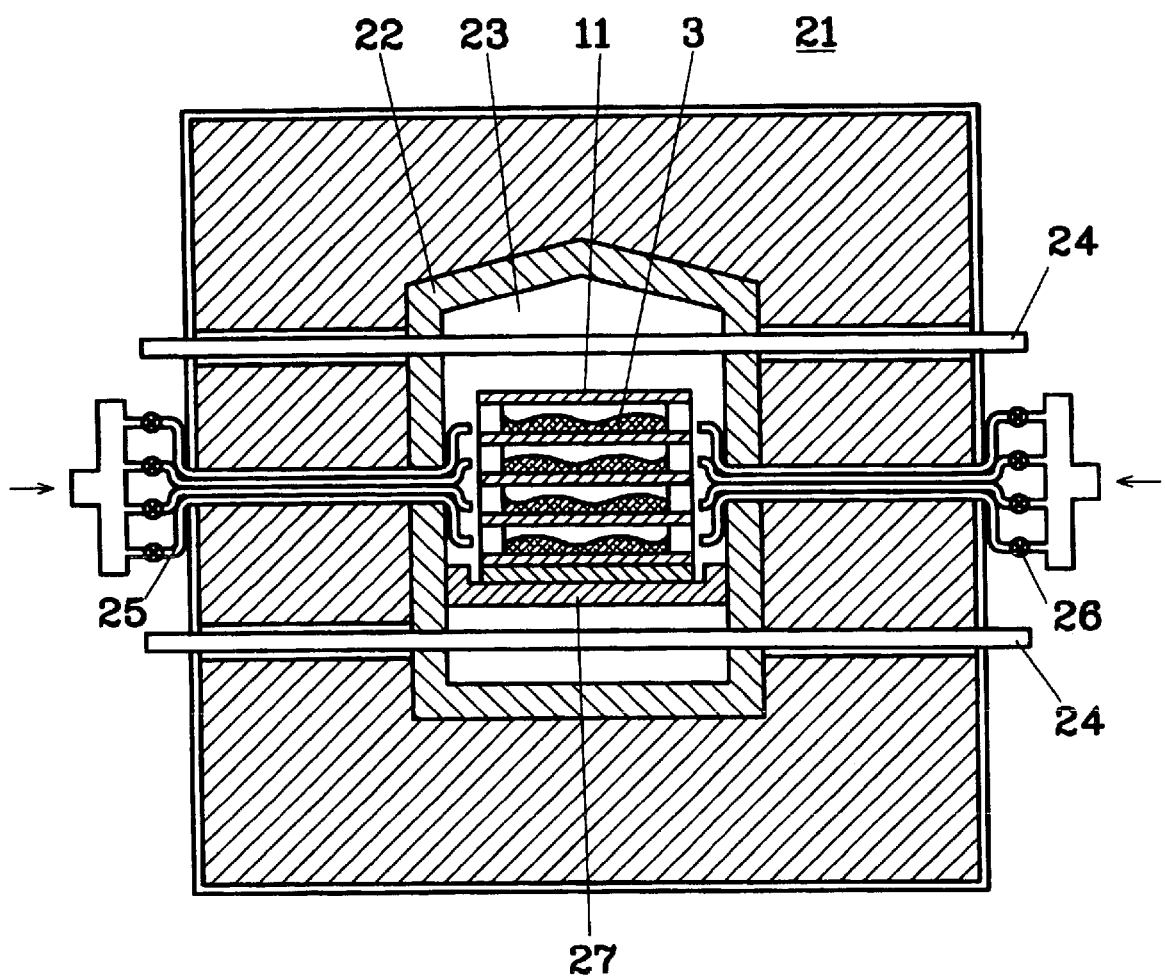
FIG. 9 provides a longitudinal sectional view of another tunnel furnace in which the pallet is mounted.

Referring to FIG. 8, the tunnel furnace 21 includes a furnace wall 22 made of a refractory material and the tunnel shaped firing chamber 23 formed inside the furnace wall 22, the firing chamber 23 being provided with a floor 27 along the lengthwise direction of the firing furnace 21. The pallet 11 is placed on the floor 27 and loaded into the firing chamber 23 by a pusher (not shown). A pair of heating elements 24 for maintaining a desired temperature in the firing chamber 23 is located at top and bottom portions of the firing chamber 23. In the present invention, it is preferable that the firing chamber 23 has a cross section of the about 0.05 m²–about 3 m² and a length of about 10 m–about 30 m. In other words, the preferable volume of the chamber 23 is about 5 m³–about 90 m³.

The tunnel furnace 21 further includes a gas feeding system for feeding atmosphere gases into the firing chamber 23, the feeding system having two sets of refractory gas pipes 25 installed at two opposite sides of the tunnel furnace 21. Each of the gas pipes 25 is made of, e.g., a silicon carbide and extends from the outside of the tunnel furnace 21 to the inside of the firing chamber 23. Further, each of the gas pipes 25 is provided with a regulating valve 26 for regulating or controlling the amount of a gas to be fed into the firing chamber 23.

FIG. 8 illustrates a first exemplary gas feeding system having, on each of two sides of the firing furnace 21, parallel and spaced apart gas pipes 25 all the way from the outside of the firing furnace 21 to the inside of the firing chamber 23. FIG. 9 shows another exemplary gas feeding system wherein the gas pipes 25 are bound together within the space between the inner wall of the firing chamber 23 and the outer wall of the firing furnace 21.

During the firing process, predetermined amounts of one or more atmosphere gases regulated by the regulating valves 26 are fed into the firing chamber 23 of the tunnel furnace 21 through the gas pipes 24. The ratio of the amount of the atmosphere gases introduced per unit time, e.g., an hour or a minute, into the firing chamber 23 to the amount of organic materials contained in the unfired ceramic bodies processed per unit time, e.g., an hour or a minute, is preferably between about 200 L/g (liters/gram) and about 1200 L/g, and more preferably, between about 300 L/g and about 900 L/g. Such controlled amounts of atmosphere gases allow a variation in the atmosphere of the firing chamber 23 of the tunnel furnace 21 to be suppressed, even in the presence of gaseous products produced by the decomposition of the organic materials contained in ceramic bodies being fired. Accordingly, it is possible to obtain the multilayered ceramic electronic components having less firing non-uniformities.

If the ratio of the amount of atmosphere gases to the organic materials introduced into the firing furnace is not big enough, variation of the atmosphere of the firing furnace due to the decomposition of the organic material may not be properly prevented. On the other hand, in case too much atmosphere gases are introduced into the firing,furnace, the cooling effect of the introduced atmosphere gases would entail undesired temperature profiles in the firing furnace to occur.

It is also preferable that the atmosphere gases in the chamber 23 of the tunnel furnace 21 have an average flow velocity ranged from about 5 m/min–about 50 m/min, and more preferably, about 15 m/min–about 40 m/min.

In general, the term "atmosphere gas" used herein generally denotes a neutral gas such as a Ni gas, but it may be a reductive gas, e.g., a $H_2$ gas, or an inert gas.

In addition, the term "the organic materials included in the unfired ceramic bodies" used in herein denotes any kinds of organic materials including binders contained therein. The amount of the organic materials contained in the unfired ceramic bodies can be simply determined from the difference between the weights of the ceramic bodies before and after the firing process.

Further, it is preferable that the atmosphere gases in the firing chamber 23 of the tunnel furnace 21 flow in a direction opposite to the loading direction in which the multilayered ceramic bodies 3 are loaded along the floor 27. To this end, the outlets of the atmosphere gases of the firing furnace 21 are preferably installed near the entrance of the firing furnace 21 through which the ceramic bodies 3 are introduced into the chamber 23 of the furnace 21. Such an arrangement of the gas pipes prevents the decomposed gases generated from the organic materials included in the ceramic bodies from reaching the firing zone in which the sintering process is carried out, thereby suppressing the occurrence of the firing non-uniformities of the fired ceramic bodies.

When firing a plurality of multilayered ceramic bodies 3 at a time using the pallet 11 having multiple shelves 13, 14, it is preferable to supply the atmosphere gases independently into the firing chamber 23 through the gas pipes 25 on the both sides of the tunnel furnace 21, as shown in FIG. 8 or 9. Through the arrangement of the gas feeding system described above, the atmosphere gases can be evenly distributed in the firing furnace 23 and into the spaces between the shelves 13, 14 of the pallet 11, enabling the suppression of the firing non-uniformities between the ceramic bodies even when a large number of ceramic bodies are fired at once.

A firing profile of the tunnel furnace 21 in accordance with the present invention is as follow. A temperature increasing rate is preferably about 50° C.–about 500° C./h, and more preferably, about 200° C.–about 300° C./h; a constant maintaining temperature is preferably about 1150° C.–about 1400° C./h, and more preferably, about 1200° C.–about 1350° C./h; a time for maintaining the constant temperature is about 0.5 hour–about 8 hours, and more preferably, about 1 hour–about 3 hours; and a cooling rate is about 50° C.–about 500° C./h, and more preferably, about 200° C.–about 300°C./h.

Figure 10:
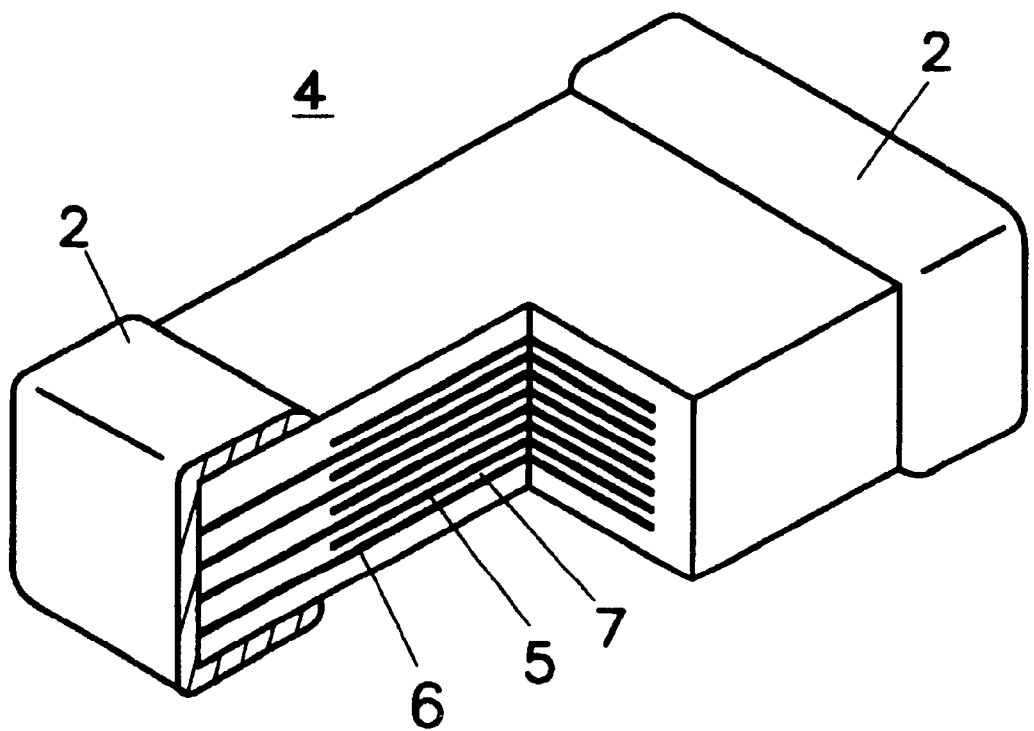
FIG. 10 sets forth a partially cutaway perspective view of a finished multilayered ceramic electronic component obtained by the method in accordance with the present invention.

As shown in FIG. 10, after firing the multilayered ceramic bodies 3, external electrodes 2 are formed at two opposite end portions of a fired multilayered ceramic bodies 4, where the internal electrodes 5 and 6 are exposed. Typically, conductive materials for use in forming the external electrodes 2 may be selected from, e.g., Ni, Ni alloy, Cu, Cu alloy, Ag or Pd or alloy thereof. The external electrodes 2 may also be formed by applying a conductive paste to two end portions of the fired ceramic body 4 by a dipping method, and subsequently, subjecting the resultant fired ceramic body to a baking process in a neutral or a reductive atmosphere at 600° C.–1000° C. The external electrodes 2 may be formed by applying first the conductive paste on the multilayered ceramic body, prior to the firing process and firing the multilayered ceramic body having thereon conductive paste. Dry deposition method such as the evaporation or the sputtering technique may also be employed in forming the external electrodes.

The multilayered ceramic capacitors obtained by the foregoing method have reduced firing non-uniformities and a reduced variation in the electric characteristics therebetween, enabling the reliable multilayered ceramic capacitors to be obtained.

The present invention has been described with respect to the multilayered ceramic capacitors. However, it should be appreciated to those skilled in the art that the present invention can be equally applied any other types of multilayered ceramic electronic components, including multilayered ceramic inductors and multilayered ceramic composite components, having various ceramic materials and internal electrode patterns with different stacking sequences.

The present invention will be described in more detail by way of examples.

EXAMPLE

Example 1 will be described first. A pot mill was charged with alumina balls and 2.5 liters of water and previously synthesized oxide materials including 0.96 part by mole of $BaTiO_3$, 0.05 part by mole of MgO having purity of 99% or higher, 0.01 part by mole of ZnO, 0.03 part by mole of $TiO_2$ and 0.005 part by mole of $Ho_2O_3$, and the resulting mixture was stirred for 15 hours.

The stirred mixture was charged into a stainless pot and dried at 150° C. for 4 hours with a hot air dryer; and the dried mixture was pulverized into coarse particles. The resultant particles were then calcined in air at approximately 1200° C. for 2 hours in a tunnel furnace, thereby producing powder of the first basic component.

Thereafter, 98 parts by mole of the powder of the first component and 2 parts by mole of powder of $CaZrO_3$ (the second basic component) were weighed, and 2 parts by weight of an additive component (0.20 $Li_2O$–0.60 $SiO_2$–0.04 SrO–0.10 MgO–0.06 ZnO) were added to 100 parts by weight of the mixture of the basic components. In addition, 15 weight % of an organic binder including a butyral based resin and 50 weight % of ethanol were also added to the mixture of the basic and the additive components, the weight % of the binder and ethanol being measured with respect to the total weight of the mixture of the basic and the additive components. The resulting mixture was then ground and mixed in a ball mill to form a slurry.

The slurry was transferred to a reverse roll coater, thereby forming a thin coat on a long polyester film. The thin coat formed on the polyester film was then heated and dried at 100° C., thereby yielding a ceramic green sheet having a film thickness of approximately 20 $\mu$m. The sheet was then cut into a plurality of square sheets having 10 cm ×10 cm.

The conductive paste for the internal electrodes was prepared by dissolving 10 g of nickel powder having an average particle size of 1.0 $\mu$m and 0.9 g of ethyl cellulose in 9.1 g of butyl carbitol and stirring the mixture for 10 hours with a stirrer. The resulting conductive paste was printed on one side of the ceramic green sheet through a screen having a certain pattern and then dried.

Thereafter, 33 sheets of such ceramic green sheets were stacked with their printed sides directed upward. The two adjacent sheets were arranged in a manner that the upper sheet is shifted from the lower sheet by about a half of one pattern size along the lengthwise direction, thereby forming a laminated body. Further, a plurality of bare ceramic green sheets without having the internal electrode patterns thereon were stacked on each of the top and the bottom surfaces of the laminated body, and then pressed with a vertical load of approximately 40 tons at a temperature of about 50° C. Thereafter, the resulting laminated ceramic body was diced into chip-shaped multilayered ceramic bodies.

Subsequently, the multilayered ceramic bodies were loaded into the furnace capable of carrying out the binder removing process. By raising the temperature of the furnace up to 400° C. at a ramping rate of 60° C./h in the air atmosphere, the binder removing process was carried out to remove the organic materials contained in the multilayered ceramic bodies.

Thereafter, the multilayered ceramic bodies were fired in the firing furnace of 3 $m^3$ in volume having the structure as shown in FIG. 9. The reductive atmosphere in the furnace was maintained during the firing process by flowing the atmosphere gases of $H_2$ (2 volume %)+$N_2$ (98 volume %) along the direction opposite to pallet loading direction under the conditions shown in Table 1. The multilayered ceramic bodies were loaded into the firing furnace using the pallet having thereon four layers of non-overlapping ceramic bodies, layers being disposed 10 mm apart from each other. The firing process was carried out by using a firing profile in which the temperature ramping rate from room temperature to a sintering temperature of 1,200° C. was 100° C. per hour and 1,200° C. (maximum temperature) was maintained for three hours, followed by cooling down to room temperature at a decreasing rate of 100° C. per hour.

Subsequently, two end portions including the side surfaces of the fired ceramic bodies where the internal electrodes were exposed were coated with a conductive paste including copper, glass frit and a vehicle, and then dried. The bodies were baked at 650° C. for 15 minutes in air, thereby forming copper electrode layers. Next, nickel layers were plated on the copper electrode layers by means of an electroless plating method, and Pb-Sn soldering layers were formed thereon by means of an electroplating method, thereby forming a pair of external electrodes.

From the finished multilayered ceramic capacitors, 50 capacitors were randomly selected and their capacitances were measured under the condition of 20° C. of temperature, 1 kHz of frequency and 1.0 V of voltage (rms) by using HP4284A from Hewlett-Packard. Thereafter, the mean(X) and the standard deviation($\sigma$) of the measured capacitances were calculated. The finished multilayered ceramic capacitors were determined as acceptable when a value (capacitance deviation) calculated by the equation below was not greater than 3%.

$$\sigma(\text{standard deviation})/X(\text{mean}) \times 100$$

The results are shown in Table 1. In Table 1, respective examples with a mark "★" are comparative examples exhibiting unacceptable results.

The parameters in Table 1 were obtained as follow: The gas flow amount used in calculating the ratio of the gas flow amount to the amount of organic materials introduced into the firing furnace by the multilayered ceramic bodies corresponds to the amount of gases introduced into the furnace per 1 hour obtained by using mass flow meters installed at the gas flow pipes. The amount of organic materials introduced into the firing furnace was obtained by (a) calculating a first amount of organic materials contained in one chip not being processed by the binder removing process from the total amounts of organic materials, excepting the solvent components, used in forming the slurry and the conductive paste for the internal electrode patterns, wherein it was assumed that all solvents contained in the slurry and the internal electrode paste evaporate during the processes for forming the slurry and the internal electrode patterns; (b) calculating a second amount of organic materials per one chip removed during the binder removing process by measuring the difference between weights of the multilayered ceramic bodies before and after the binder removing process by using a TG (thermogravimetry) method; (c) obtaining a third amount of organic materials per one chip remaining after the binder removing process from the difference between the first and the second amounts; and (d) finally multiplying the obtained third amount of organic materials and the number of chips loaded into the firing furnace per 1 hour.

The average gas flow velocity in the furnace was calculated by dividing the foregoing gas flow amount by a cross sectional area taken along a direction perpendicular to a flowing direction of the gases.

TABLE 1

| gas flow amount/ amount of organic | average gas flow | space between the shelves of | capacitance |
| --- | --- | --- | --- |

| example nos. | materials (L/g) | velocity (m/min) | the pallet (mm) | deviation (%) |
|---|---|---|---|---|
| 1 | 600 | 30 | 10 | 0.78 |
| * 2 | 100 | 30 | 10 | 5.47 |
| 3 | 200 | 30 | 10 | 2.72 |
| 4 | 300 | 30 | 10 | 1.36 |
| 5 | 900 | 30 | 10 | 1.24 |
| 6 | 1200 | 30 | 10 | 2.68 |
| * 7 | 1500 | 30 | 10 | 4.56 |
| * 8 | 400 | 3 | 10 | 3.65 |
| 9 | 400 | 5 | 10 | 2.87 |
| 10 | 400 | 15 | 10 | 1.45 |
| 11 | 400 | 30 | 10 | 0.96 |
| 12 | 400 | 40 | 10 | 1.13 |
| 13 | 400 | 50 | 10 | 2.08 |
| *14 | 400 | 70 | 10 | 3.04 |
| 15 | 600 | 30 | 0 | 1.66 |

In examples 2–7, the ratios of the gas flow amount to the amount of organic materials were varied from that of example 1, respectively, by changing the numbers of the multilayered ceramic bodies loaded into the furnace.

In each of the examples 8–14, the average flow velocity and the amount of the multilayered ceramic bodies loaded into the furnace were changed from those of example 1.

In example 15, the firing process was carried out without maintaining spaces between shelves of the pallet.

As shown in Table 1, when the ratios of gas flow amount to amount of organic materials are within the ranges of about 200 L/g–about 1200 L/g and about 300 L/g–about 900 L/g, the capacitance deviations may fall below about 3.0% and below about 1.5%, respectively.

Further, when the average flow velocity is within about 5 m/min–about 50 m/min, and preferably, about 15 m/min–about 40 m/min, the capacitance deviation can be suppressed.

In addition, by forming spaces between the shelves of the pallet, the capacitance deviation may also be further suppressed.

Although the invention has been shown and described with respect to the preferred embodiments, it will be understood by those skilled in the art that various changes and modifications may be made without departing from the spirit and scope of the invention as defined in the following claims.

What is claimed is:

1. A method for manufacturing a multilayered ceramic electronic component including the step of firing multilayered ceramic bodies having therein ceramic layers and internal electrodes in a firing furnace while flowing one or more atmosphere gases thereinto, wherein the ratio of the amount of the atmosphere gases introduced into the firing furnace per a time period to the amount of organic materials included in the multilayered ceramic bodies introduced into the firing furnace per the time period is between about 200 L/g (liters/gram) and about 1200 L/g.

2. The method of claim 1, wherein the ratio is between about 300 L/g and about 900 L/g.

3. The method of claim 1, wherein the multilayered ceramic bodies are introduced into the firing furnace a long a first direction and the atmosphere gases flow in the firing furnace along a direction opposite to the first direction.

4. The method of claim 1, wherein an average flow velocity of the atmosphere gases in the firing furnace is about 5 m/min–about 50 m/min.

5. The method of claim 4, wherein the average flow velocity is about 15 m/min–about 40 m/min.

6. The method of claim 1, wherein the atmosphere gases are fed independently from two sides of the firing furnace.

7. The method of claim 6, wherein the firing furnace is provided with gas pipes, and the atmosphere gases are introduced into the firing furnace directly from the gas pipes.

8. The method of claim 1, further comprising the steps of:

placing the multilayered ceramic bodies on shelves;

loading the shelves into the firing furnace in order to fire the multilayered ceramic bodies; and unloading the shelves from the firing furnace after finishing the firing step.

9. The method of claim 8, wherein the shelves are stacked shelves maintaining a predetermined distance between every two neighboring shelves.

* * * * *